(12) United States Patent
Zhang et al.

(10) Patent No.: US 10,950,264 B2
(45) Date of Patent: Mar. 16, 2021

(54) TRANSDUCER POSITIONS FOR DUAL ACTUATOR DATA STORAGE DEVICES

(71) Applicant: Seagate Technology LLC, Cupertino, CA (US)

(72) Inventors: Li Hong Zhang, Singapore (CN); Xiong Liu, Singapore (CN)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/453,301

(22) Filed: Jun. 26, 2019

(65) Prior Publication Data

US 2020/0411041 A1    Dec. 31, 2020

(51) Int. Cl.
G11B 5/55    (2006.01)
G11B 5/60    (2006.01)
G11B 5/48    (2006.01)

(52) U.S. Cl.
CPC .......... *G11B 5/5578* (2013.01); *G11B 5/4826* (2013.01); *G11B 5/4886* (2013.01); *G11B 5/6005* (2013.01)

(58) Field of Classification Search
None
See application file for complete search history.

(56) References Cited

U.S. PATENT DOCUMENTS

| | | | | |
|---|---|---|---|---|
| 4,219,853 A * | 8/1980 | Albert et al. | ........ | G11B 5/3103 360/234.7 |
| 4,555,740 A * | 11/1985 | Jackson et al. | ...... | G11B 5/3967 360/318 |
| 4,568,988 A * | 2/1986 | McGinlay et al. | .... | G11B 5/012 360/77.02 |
| 5,073,835 A * | 12/1991 | Sano et al. | ......... | G11B 5/59655 360/77.04 |
| 5,223,993 A * | 6/1993 | Squires et al. | ....... | G11B 5/5578 360/246.7 |
| 5,555,147 A * | 9/1996 | Maruyama | ........... | G11B 5/3967 360/317 |
| 5,621,595 A * | 4/1997 | Cohen | .................. | G11B 5/3967 360/125.51 |
| 5,634,259 A * | 6/1997 | Sone et al. | ........... | G11B 5/6005 29/603.12 |
| 5,650,893 A | 7/1997 | Bolasna et al. | | |
| 5,654,853 A * | 8/1997 | Hagen | .................. | G11B 5/6005 360/264.1 |
| 5,751,512 A * | 5/1998 | Anderson | .............. | G11B 5/012 360/78.04 |
| 5,793,579 A * | 8/1998 | Yamamoto et al. | ........................ | G11B 5/3106 360/317 |

(Continued)

*Primary Examiner* — Craig A. Renner
(74) *Attorney, Agent, or Firm* — Faegre Drinker Biddle & Reath LLP

(57) ABSTRACT

A hard disk drive includes a first actuator and a second actuator. The first actuator is coupled to a first slider, which includes a first read transducer and a first write transducer. Both the first read transducer and the first write transducer are positioned away from a first longitudinal centerline of the first slider. The second actuator is coupled to a second slider, which includes a second read transducer and a second write transducer. Both the second read transducer and the second write transducer are positioned away from a second longitudinal centerline of the second slider.

15 Claims, 3 Drawing Sheets

(56) References Cited

U.S. PATENT DOCUMENTS

| | | | |
|---|---|---|---|
| 5,896,243 A * | 4/1999 | Koshikawa et al. | G11B 5/3967 360/234.7 |
| 5,923,488 A * | 7/1999 | Ino | G11B 21/085 360/121 |
| 7,724,473 B1 * | 5/2010 | Krajnovich | G11B 5/6005 360/235.4 |
| 9,875,758 B1 | 1/2018 | Trantham et al. | |
| 10,002,625 B1 | 6/2018 | Erden | |
| 10,210,891 B1 | 2/2019 | Tian et al. | |
| 2002/0015265 A1 * | 2/2002 | Kanda et al. | G11B 5/3967 360/236.5 |
| 2004/0165311 A1 * | 8/2004 | Yamanaka et al. | G11B 5/3967 360/128 |
| 2005/0152067 A1 | 7/2005 | Yip et al. | |
| 2007/0035877 A1 * | 2/2007 | Maejima et al. | G11B 5/3967 360/122 |
| 2014/0340790 A1 * | 11/2014 | Adachi et al. | G11B 5/82 360/135 |
| 2018/0047421 A1 | 2/2018 | Adachi et al. | |

\* cited by examiner

TRANSDUCER POSITIONS FOR DUAL ACTUATOR DATA STORAGE DEVICES

SUMMARY

In certain embodiments, a hard disk drive includes a first actuator and a second actuator. The first actuator is coupled to a first slider, which includes a first read transducer and a first write transducer. Both the first read transducer and the first write transducer are positioned away from a first longitudinal centerline of the first slider. The second actuator is coupled to a second slider, which includes a second read transducer and a second write transducer. Both the second read transducer and the second write transducer are positioned away from a second longitudinal centerline of the second slider.

In certain embodiments, a slider for use in a hard disk drive is disclosed. The slider includes a body, a read transducer, and a write transducer. The body is bisected by a longitudinal axis and includes a leading edge, a trailing edge, an inner edge, and an outer edge. Both the read transducer and the write transducer are centered at respective center points each of which is positioned towards the inner edge or the outer edge away from the longitudinal axis.

In certain embodiments, a magnetic recording medium includes a recording area positioned between a first non-recording area and a second non-recording area. The recording area covers 75% to 95% of the magnetic recording medium While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
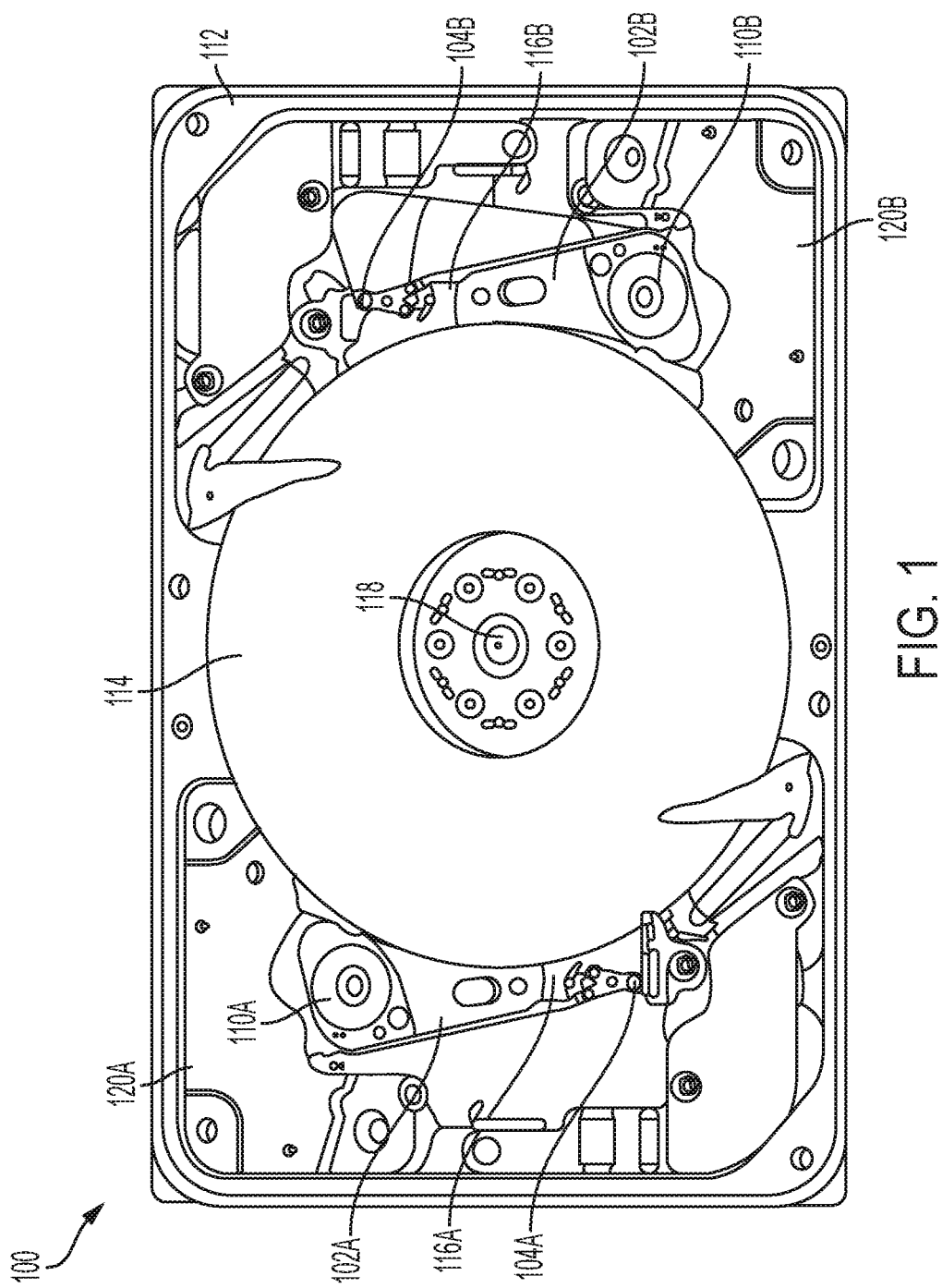
FIG. 1 shows a top view of a hard disk drive, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Hard disk drives include sliders with one or more read transducers to read data from magnetic recording media and with one or more write transducers to write data to magnetic recording media. Currently, the read transducers and the write transducers are positioned together along a centerline of the sliders. During operation of the hard disk drive when the sliders are positioned above the outer regions and the inner regions of the magnetic recording media, the read transducers and the write transducers cannot access the outermost and the innermost regions of the magnetic recording media due to the transducers being positioned at the center of the sliders. This limits the available real estate of the magnetic recording media that can be used for storing data. Certain embodiments of the present disclosure feature read transducers and write transducers that are positioned to increase the available real estate for recording data to and reading data from magnetic recording media.

Figure 3B:
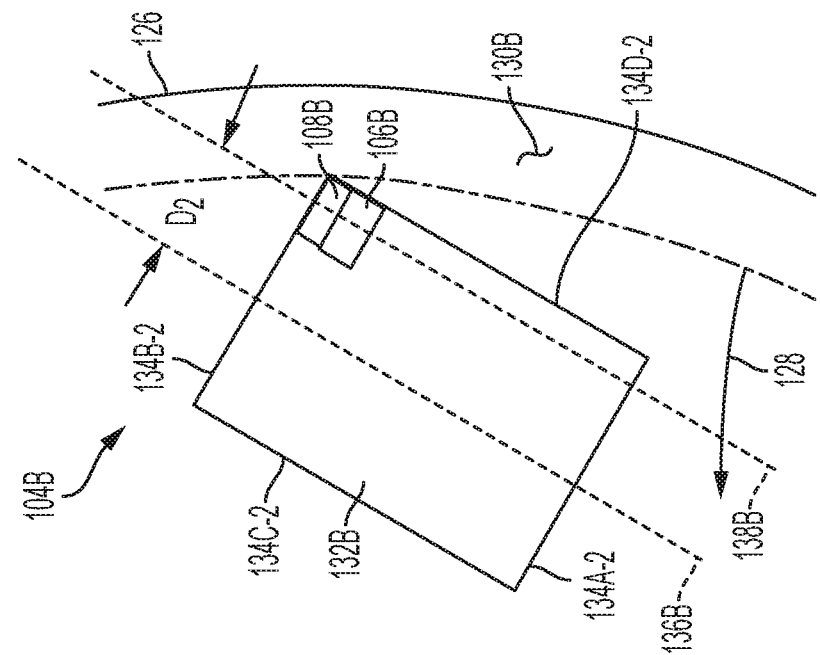
FIGS. 3A and 3B show see-through views of sliders positioned with respect to a magnetic recording medium, in accordance with certain embodiments of the present disclosure.
Figure 3A:
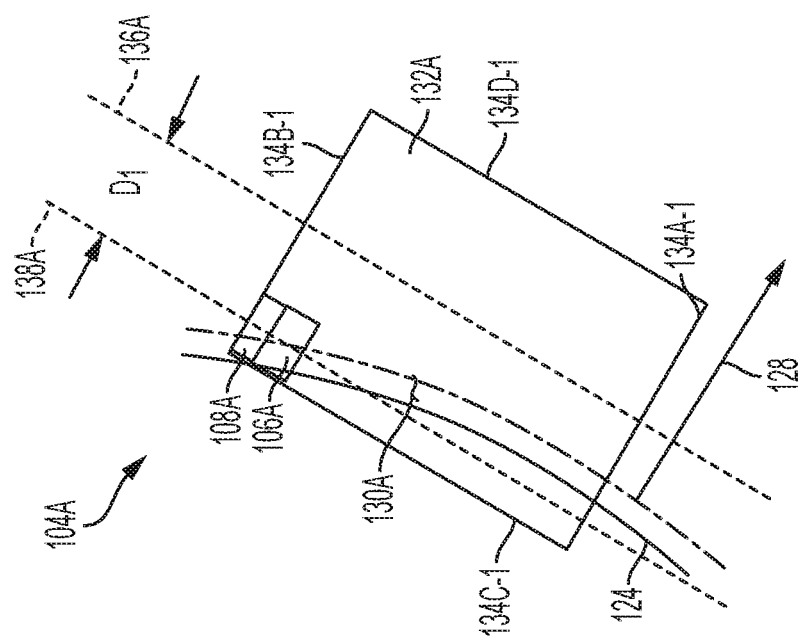

FIG. 1 shows a hard disk drive 100 that includes a first actuator 102A and a second actuator 102B each coupled to one or more sliders 104A and 104B positioned at a distal end of the respective actuators 102A and 102B. As shown in FIG. 3A, the first slider 104A includes a first read transducer 106A and a first write transducer 108A, and FIG. 3B shows the second slider 104B including a second read transducer 106B and a second write transducer 108B. In FIG. 1, the first and the second actuators 102A and 102B have separate pivot axes and are coupled to separate pivot bearings 110A and 110B coupled to a base deck 112. As such, the first slider 104A coupled to the first actuator 102A accesses the same magnetic recording media 114 as the second slider 104B coupled to the second actuator 102B but at different portions of the magnetic recording media 114 at any given point in time.

The first and the second actuators 102A and 102B are housed in an enclosure formed by the base deck 112 and a cover (not shown). The sliders 104A and 104B are coupled to the respective first and the second actuators 102A and 102B by suspension assemblies 116A and 116B, which help suspend the sliders 104A and 104B over the magnetic recording media 114. In operation, a spindle motor 118 rotates the magnetic recording media 114 while the first and the second actuators 102A and 102B are driven by respective voice coil motor assemblies 120A and 120B.

Figure 2:
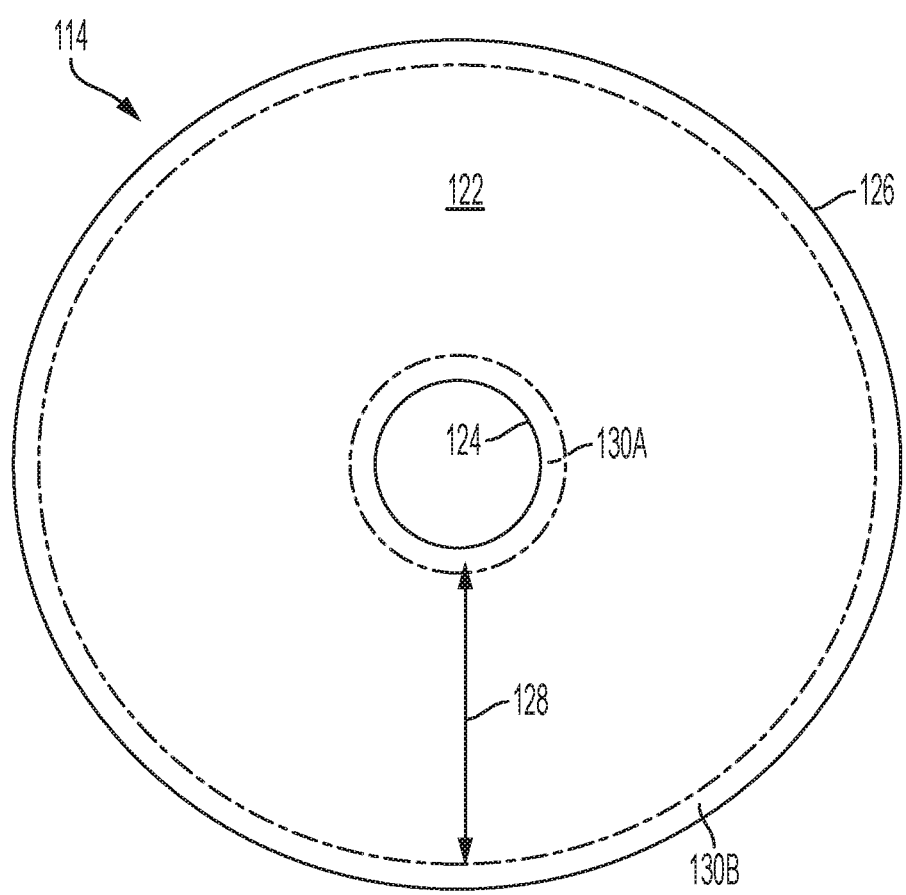
FIG. 2 shows a top view of a magnetic recording medium, in accordance with certain embodiments of the present disclosure.

FIG. 2 shows a top view of one top surface 122 of one of the magnetic recording media 114 (singularly referred to as a magnetic recording medium). The magnetic recording medium 114 includes an inner diameter 124 and an outer diameter 126. The inner diameter 124 is sized to couple to the spindle motor 118 as shown in FIG. 1. The magnetic recording media 114 include a substrate (not shown) and a magnetic recording layer deposited to the substrate. The top surface 122 includes one or more recording zones 128 and one or more non-recording zones 130A and 130B. The recording zone 128 includes the area of the magnetic recording medium 114 where data can be stored and retrieved by the various sliders' respective read transducers and write transducers. For example, the recording zone 128 includes concentric data tracks to which user and system data are recorded to and retrieved from. FIG. 2 shows the recording zone 128 as the area between an inner dashed circle and an outer dashed circle.

The magnetic recording medium 114 of FIG. 2 includes two non-recording zones with the first non-recording zone 130A positioned at the innermost part of the magnetic recording media 114 and the second non-recording zone 130B positioned at the outermost part of the magnetic recording media 114. The non-recording zones 130A and 130B cannot be accessed by the read transducers (e.g., 106A and 106B) and the write transducers (e.g., 108A and 108B) on the sliders (e.g., 104A and 104B) because the transducers cannot be positioned over the non-recording zones 130A and 130B. FIGS. 3A and 3B show examples of how the sliders 104A and 104B can be positioned above the magnetic recording medium 114 to access the innermost and outermost portions of the recording zone 128 that could not otherwise be accessed by sliders with transducers positioned along a center of the slider.

FIG. 3A shows the first slider 104A positioned above the magnetic recording medium 114 near the inner diameter 124. As shown in FIG. 3A, the first non-recording zone 130A of the magnetic recording medium 114 ranges between the inner diameter 124 of the magnetic recording medium 114 and the innermost portion of the recording zone 128. The innermost portion of the recording zone 128 is determined by the extent that the first read transducer 106A and the first write transducer 108A can be positioned near the inner diameter 124 of the magnetic recording medium 114. As will be described in more detail below, the first read transducer 106A and the first write transducer 108A are positioned on the first slider 104A to increase the area of the recording zone 128 compared to traditional positioning of read transducers and write transducers on sliders.

As shown in FIG. 3A, the first slider 104A includes the first read transducer 106A and the first write transducer 108A that are at least partially embedded or otherwise coupled to a first body 132A of the first slider 104A. The first slider 104A includes a leading edge 134A-1, a trailing edge 134B-1, an inner edge 134C-1, and an outer edge 134D-1.

The first read transducer 106A and the first write transducer 108A are both positioned near the trailing edge 134B-1 and both positioned away from a first longitudinal centerline 136A of the first slider 104A towards the inner edge 134C-1 and towards the inner diameter 124 of the magnetic recording medium 114. In certain embodiments, the first read transducer 106A and the first write transducer 108A are centered along a first transducer centerline 138A. In other embodiments, the center points of the first read transducer 106A and the first write transducer 108A are offset from each other. Whether aligned or offset, the first read transducer 106A and the first write transducer 108A can be respectively centered such that the central point of the respective transducers is positioned away from the first longitudinal centerline 136A 50-95% (e.g., 50%, 60%, 70%, 80%, 90%, 95%) of a distance ($D_1$) between the first longitudinal centerline 136A and the inner edge 134C-1 of the first slider 104A. For example, if the first slider 104A has a width (measured by a distance between the inner edge 134C-1 and the outer edge 134D-1) of 0.77 mm, the distance $D_1$ would be 0.385 mm and the center points of the respective transducers (e.g., along the first transducer centerline 138A) would be positioned 0.1925 mm to 0.36575 mm from the first longitudinal centerline 136A.

The closer the first read transducer 106A and the first write transducer 108A are positioned to the inner edge 134C-1 (and positioned away from the first longitudinal centerline 136A), the larger the recording zone 128 can extend towards the inner diameter 124 of the magnetic recording medium 114. Put another way, positioning the first read transducer 106A and the first write transducer 108A towards the inner edge 134C-1 and away from the first longitudinal centerline 136A increases the available real estate for recording data near the inner diameter 124 of the magnetic recording medium 114. For example, positioning the first read transducer 106A and the first write transducer 108A 0.25 mm from the first longitudinal centerline 136A increases the available real estate (as measured by a radial distance) by 0.25 mm compared to a slider with transducers positioned along the first longitudinal centerline 136A. This can increase the number of available data tracks by about 5,000 or more tracks for a magnetic recording medium with 500,000 tracks per inch.

FIG. 3B shows the second slider 104B positioned above the magnetic recording medium 114 near the outer diameter 126. As shown in FIG. 3B, the second non-recording zone 130B of the magnetic recording medium 114 ranges between the outer diameter 126 of the magnetic recording medium 114 and the outermost portion of the recording zone 128. The outermost portion of the recording zone 128 is determined by the extent that the second read transducer 106B and the second write transducer 108B can be positioned near the outer diameter 126 of the magnetic recording medium 114. As will be described in more detail below, the second read transducer 106B and the first write transducer 108B are positioned on the second slider 104B to increase the area of the recording zone 128 compared to traditional positioning of read transducers and write transducers on sliders.

As shown in FIG. 3B, the second slider 104B includes the second read transducer 106B and the second write transducer 108B that are at least partially embedded or otherwise coupled to a second body 132B of the second slider 104B. The second slider 104B includes a leading edge 134A-2, a trailing edge 134B-2, an inner edge 134C-2, and an outer edge 134D-2.

The second read transducer 106B and the second write transducer 108B are both positioned near the trailing edge 134B-2 and are both positioned away from a second longitudinal centerline 136B of the second slider 104B towards the outer edge 134D-2 and towards the outer diameter 126 of the magnetic recording medium 114. In certain embodiments, the second read transducer 106B and the second write transducer 108B are centered along a second transducer centerline 138B. In other embodiments, the center points of the second read transducer 106B and the second write transducer 108B are offset from each other. Whether aligned or offset, the second read transducer 106B and the second write transducer 108B can be respectively centered such that the central point of the respective transducers is positioned away from the second longitudinal centerline 136B 50-95% (e.g., 50%, 60%, 70%, 80%, 90%, 95%) of a distance ($D_2$) between the second longitudinal centerline 136B and the outer edge 134D-2 of the second slider 104B.

The closer the second read transducer 106B and the second write transducer 108B are positioned to the outer edge 134D-2 (and positioned away from the second longitudinal centerline 136B), the larger the recording zone 128 can extend towards the outer diameter 126 of the magnetic recording medium 114. Put another way, positioning the second read transducer 106B and the second write transducer 108B towards the outer edge 134D-2 and away from the second longitudinal centerline 136B increases the available real estate for recording data near the outer diameter 126 of the magnetic recording medium 114.

As described above, the first actuator 102A can include sliders (e.g., the first slider 104A) with read transducers (e.g., the first read transducer 106A) and write transducers (e.g., the first write transducer 108A) that are positioned towards inner edges of the sliders such that the transducers can access data close to the inner diameter 124 of the magnetic recording medium 114. In a similar vein, the second actuator 102B can include sliders (e.g., the second slider 104B) with read transducers (e.g., the second read transducer 106B) and write transducers (e.g., the second write transducer 108B) that are positioned towards outer edges of the sliders such that the transducers can access data close to the outer diameter 126 of the magnetic recording medium 114. With the above-described transducer positioning, the available real estate of the magnetic recording medium 114 (e.g., the recording zone 128) can be increased compared to magnetic recording media used with traditional sliders. For example, the recording zone 128 of the magnetic recording media 114 can have an innermost radius (measured from a center point of the magnetic recording medium 114) from 13.66 mm to 13.84 mm and an outermost radius from 27.48 mm to 27.66 mm for media having an outer diameter of 57 mm for use in hard disk drives having a 2.5 inch form factor. For magnetic recording media 114 having an outer diameter of 87 mm, the media can have an innermost radius from 18.49 mm to 18.67 mm and an outermost radius from 41.46 mm to 41.64 mm for use in hard disk drives having a 3.5 inch form factor. The magnetic recording media 114 can have larger or smaller outer diameters (e.g., 55-57 mm or 65-67 mm for 2.5 inch form factor; 85-87 mm or 95-97 mm for 3.5 inch form factor). In certain embodiments, the recording zone 128 covers 75 to 95% of the magnetic recording media 114. In certain embodiments, the recording zone 128 covers 79 to 81% of the magnetic recording media 114. With the above-described transducer positioning, the innermost portion of the recording zone 128 can only be accessed by the first read transducer 106A and the first write transducer 108A, and the outermost portion of the recording zone 128 can only be accessed by the second read transducer 106B and the second write transducer 108B.

The first slider 104A and the second slider 104B can incorporate additional components, including additional read transducers, write transducers, heating elements for head-to-media spacing control, and/or thermoresistive sensors for head-media contact detection. For example, hard disk drives can utilize a variety of recording technologies such as heat-assisted magnetic recording (HAMR), microwave-assisted magnetic recording (MAMR), vector magnetic recording, shingled magnetic recording (SMR), two-dimensional magnetic recording (TDMR), multi-sensor magnetic recording (MSMR), bit-pattern media (BPM) magnetic recording, and more.

The various recording technologies may require the sliders to include additional components such as lasers, waveguides, near-field transducers, spin-torque oscillators, etc. Positioning the transducers as shown and described herein can be used in concert with hard disk drives that utilized the various recording technologies. For example, for hard disk drives that use HAMR, near-field transducers can also be positioned near the inner edges or outer edges of the sliders along with the other transducers. As noted above, the various transducer positions shown and described herein increase the overall available real estate on the magnetic recording media 114 for storing data.

Each actuator in the hard disk drive 100 can be coupled to more than one slider. For example, both the first actuator 102A and the second actuator 102B can include one to twenty sliders and respective sets of transducers. In certain embodiments, all of the sliders of a hard disk drive include transducers that are all positioned near the inner edge of the sliders away from the central longitudinal axis of the sliders. In other embodiments, all of the sliders of a hard disk drive include transducers that are all positioned near the outer edge of the sliders away from the central longitudinal axis of the sliders. Although the hard disk drive 100 shown and described herein includes two actuators, the hard disk drive 100 can include fewer or more actuators.

Further, in embodiments with multiple actuators, the actuators can be in a stacked arrangement such that they share a common pivot point. In such embodiments, each slider can include transducers that are all positioned near the outer edge of the sliders away from the central longitudinal axis of the sliders. Increasing the radial dimension of the recording area near the outer diameter of the magnetic recording media adds more recording area to the media than the amount of recording area "lost" near the inner diameter. In addition, the outer diameter of the magnetic recording media rotates faster compared to the inner diameter, which can result in faster data access speeds for data accessed at the outer portions of the media.

In certain embodiments, each slider includes two sets of transducers: one set of read and write transducers positioned near an inner edge of the slider and a second set of read and write transducers positioned near an outer edge of the slider. As such, the total recording area of the magnetic recording media can be increased in a hard disk drive with a single actuator or a hard disk drive with dual actuators that share a common pivot access, as compared to sliders with transducers positioned only centrally on the sliders.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A hard disk drive comprising:
   a magnetic recording medium having an inner diameter and an outer diameter;
   a first actuator coupled to a first slider, the first slider including a first read transducer and a first write transducer with both the first read transducer and the first write transducer positioned away from a first longitudinal centerline of the first slider towards the inner diameter of the magnetic recording medium, the first write transducer is the only write transducer on the first slider; and
   a second actuator coupled to a second slider, the second slider including a second read transducer and a second write transducer with both the second read transducer and the second write transducer positioned away from a second longitudinal centerline of the second slider towards the outer diameter of the magnetic recording medium, the second write transducer is the only write transducer on the second slider.

2. The hard disk drive of claim 1, wherein the first actuator is coupled to a third slider that includes a third read transducer and a third write transducer with both the third read transducer and the third write transducer positioned away from a third longitudinal centerline of the third slider towards the inner diameter of the magnetic recording medium, the third write transducer is the only write transducer on the third slider.

3. The hard disk drive of claim 2, wherein the second actuator is coupled to a fourth slider that includes a fourth read transducer and a fourth write transducer with both the fourth read transducer and the fourth write transducer positioned away from a fourth longitudinal centerline of the fourth slider towards the outer diameter of the magnetic recording medium, the fourth write transducer is the only write transducer on the fourth slider.

4. The hard disk drive of claim 1, further comprising:
   a base deck; and
   first and second pivot bearings coupled to the base deck, wherein the first actuator is coupled to the first pivot bearing, wherein the second actuator is coupled to the second pivot bearing.

5. The hard disk drive of claim 1, wherein either or both of the first read transducer and the first write transducer are centered along a transducer centerline, which is positioned away from the first longitudinal centerline 50-95% of a distance between the first longitudinal centerline and an inner edge or outer edge of the first slider.

6. The hard disk drive of claim 1, wherein either or both of the second read transducer and the second write transducer are centered along a transducer centerline, which is positioned away from the second longitudinal centerline 50-95% of a distance between the second longitudinal centerline and an inner edge or outer edge of the second slider.

7. The hard disk drive of claim 1, wherein the first read transducer and the first write transducer are positioned near a first trailing edge of the first slider, wherein the second read transducer and the second write transducer are positioned near a second trailing edge of the second slider.

8. The hard disk drive of claim 1,
wherein the magnetic recording medium comprises a recording area positioned between a first non-recording area and a second non-recording area, the recording area covering 75% to 95% of the magnetic recording medium.

9. The hard disk drive of claim 8, wherein the recording area covers 79% to 81% of the magnetic recording medium.

10. The hard disk drive of claim 8, wherein the magnetic recording medium has an outer diameter of 55-57 mm.

11. The hard disk drive of claim 8, wherein the magnetic recording medium has an outer diameter of 65-67 mm.

12. The hard disk drive of claim 8, wherein the magnetic recording medium has an outer diameter of 85-87 mm.

13. The hard disk drive of claim 8, wherein the magnetic recording medium has an outer diameter of 95-97 mm.

14. The hard disk drive of claim 1, wherein the first write transducer is arranged to access an inner portion of the magnetic recording medium inaccessible by the second write transducer.

15. The hard disk drive of claim 1, wherein the second write transducer is arranged to access an outer portion of the magnetic recording medium inaccessible by the first write transducer.

* * * * *